United States Patent
Nachbar et al.

(10) Patent No.: US 9,085,214 B2
(45) Date of Patent: Jul. 21, 2015

(54) CONNECTION ARRANGEMENT FOR A MOTOR VEHICLE WHEEL SUSPENSION

(71) Applicant: ZF Friedrichshafen AG, Friedrichshafen (DE)

(72) Inventors: Frank Nachbar, Osnabruck (DE); Martin Rechtien, Neuenkirchen (DE); Volker Grube, Diepholz (DE)

(73) Assignee: ZF Friedrichshafen, AG, Friedrichshafen (DE)

( * ) Notice: Subject to any disclaimer, the term of this patent is extended or adjusted under 35 U.S.C. 154(b) by 0 days.

(21) Appl. No.: 14/370,497

(22) PCT Filed: Jan. 28, 2013

(86) PCT No.: PCT/EP2013/051524
§ 371 (c)(1),
(2) Date: Jul. 3, 2014

(87) PCT Pub. No.: WO2013/127582
PCT Pub. Date: Sep. 6, 2013

(65) Prior Publication Data
US 2014/0376989 A1    Dec. 25, 2014

(30) Foreign Application Priority Data
Feb. 28, 2012    (DE) .......................... 10 2012 202 988

(51) Int. Cl.
*B60G 21/055*    (2006.01)
*B60G 11/50*    (2006.01)
(Continued)

(52) U.S. Cl.
CPC .............. *B60G 21/055* (2013.01); *B60G 11/50* (2013.01); *B60G 15/063* (2013.01);
(Continued)

(58) Field of Classification Search
CPC .............................. B60G 21/055; B60G 11/50
USPC .................... 280/124.152, 124.106, 124.107, 280/86.754, 86.756; 29/898.043, 898.044; 403/122, 132, 133, 135, 68
See application file for complete search history.

(56) References Cited

U.S. PATENT DOCUMENTS 3,967,857 A      7/1976   Asberg
4,360,284 A  *  11/1982   Brandenburg ................ 403/133
(Continued)

FOREIGN PATENT DOCUMENTS

DE    24 49 381 A1   A1    4/1975
DE    196 45 132   A1    5/1998
(Continued)

OTHER PUBLICATIONS

German Search Report Corresponding to 10 2012 202 988.5 mailed Nov. 26, 2012 6 pages.
(Continued)

*Primary Examiner* — Paul N Dickson
*Assistant Examiner* — Darlene P Condra
(74) *Attorney, Agent, or Firm* — Davis & Bujold, P.L.L.C.; Michael J. Bujold

(57) ABSTRACT

A connecting arrangement for a motor vehicle wheel suspension, with a spring plate for receiving a vehicle spring, a joint and a connecting strut, which is articulated to the spring plate by way of the joint. The joint includes a fastening section that extends in an axial direction and engages in a fastening hole formed in the spring plate. The fastening section passes through the fastening hole and is shaped outside the hole, on a side of the spring plate facing away from the joint, to form a contact surface that is supported axially against the spring plate.

15 Claims, 3 Drawing Sheets

(51) Int. Cl.
 *B60G 15/06* (2006.01)
 *F16C 11/06* (2006.01)

(52) U.S. Cl.
 CPC ....... *B60G 21/0551* (2013.01); *F16C 11/0652* (2013.01); *B60G 2202/135* (2013.01); *B60G 2202/312* (2013.01); *B60G 2204/1224* (2013.01); *B60G 2204/1242* (2013.01); *B60G 2204/416* (2013.01); *B60G 2204/422* (2013.01); *Y10T 403/32131* (2015.01)

(56) References Cited

U.S. PATENT DOCUMENTS

| | | | | |
|---|---|---|---|---|
| 5,676,485 | A | * | 10/1997 | Lee ................................ 403/135 |
| 5,876,148 | A | | 3/1999 | Kraps |
| 6,098,287 | A | | 8/2000 | Takahashi et al. |
| 6,254,114 | B1 | * | 7/2001 | Pulling et al. ............. 280/93.511 |
| 6,293,724 | B1 | * | 9/2001 | Spears et al. ................... 403/122 |
| 6,533,490 | B2 | * | 3/2003 | Kincaid et al. ................. 403/133 |
| 7,513,514 | B1 | * | 4/2009 | Schlosser et al. ........ 280/93.511 |
| 2008/0056811 | A1 | * | 3/2008 | Urbach .......................... 403/122 |
| 2009/0129854 | A1 | * | 5/2009 | Walter et al. .................... 403/42 |
| 2011/0150563 | A1 | * | 6/2011 | Kuroda .......................... 403/122 |
| 2013/0121755 | A1 | * | 5/2013 | Watanabe et al. ............. 403/134 |
| 2013/0287478 | A1 | * | 10/2013 | Shibata et al. ............... 403/134 |

FOREIGN PATENT DOCUMENTS

| | | |
|---|---|---|
| DE | 697 26 153 T2 | 8/2004 |
| DE | 10 2005 016 933 A1 | 11/2006 |
| DE | 10 2006 056 632 A1 | 3/2007 |
| EP | 0 775 603 A1 | 5/1997 |
| EP | 1 953 012 A2 | 8/2008 |
| EP | 2 270 344 A1 | 1/2011 |
| GB | 507 025 | 6/1939 |
| JP | 8-295116 A | 11/1996 |

OTHER PUBLICATIONS

International Search Report Corresponding to PCT/EP2013/051524 mailed Mar. 27, 2013 7 pages.
Written Opinion Corresponding to PCT/EP2013/051524 mailed Mar. 27, 2013 7 pages.

* cited by examiner

CONNECTION ARRANGEMENT FOR A MOTOR VEHICLE WHEEL SUSPENSION

This application is a National Stage completion of PCT/EP2013/051524 filed Jan. 28, 2013, which claims priority from German patent application serial no. 10 2012 202 988.5 filed Feb. 28, 2012.

FIELD OF THE INVENTION

The invention concerns a connection system for a motor vehicle wheel suspension, having a spring plate for receiving a vehicle spring, a joint and a connecting strut which, by means of the joint, is connected with the spring plate, which joint comprises a fastening section that extends in an axial direction and engages in a fastening hole provided in the spring plate.

BACKGROUND OF THE INVENTION

EP 1 953 012 A2 describes a ball joint formed of a ball of a ball pin fitted into a thin-walled sliding shell in an articulated manner, wherein the end of the strut body and the sliding shell together have a plastic covering injection molded at least partially around them, the covering forming the connection between the strut body and the thin-walled sliding shell.

In the wheel suspension of a vehicle, such a ball joint can be used for connecting a stabilizer to a compression strut, this connection usually being formed by a shackle or clamping strip attached by welding or by interlocking or frictional means to a damper tube of the compression strut. With a welded joint between the compression strut and the ball joint the welding process has to be carried out very precisely (the damper tube and the shackle are components with different thicknesses). Furthermore, the welding process can result in warping of the damper tube. Moreover, already with small production runs the investment costs are high. Finally, this arrangement for connecting the stabilizer is relatively bulky when it must be ensured that large forces can be transmitted. If the compression strut is connected to the ball joint by clamping means, the interlock or frictional connection in the tension and compression directions cannot be realized with the same quality so that, particularly with large forces, that type of connection cannot be used.

A connecting arrangement of the type mentioned to begin with is known from DE 10 2005 016 933 A1. In this case the fastening hole is formed by a funnel in combination with a fixing thread. The joint is in the form of a ball joint which can rest axially against an end face of the funnel. In addition, a stabilizer can be connected to the spring plate by means of the joint.

The disadvantage of such a connection system is that an internal thread has to be formed in the fastening hole, and an external thread on the fastening section of the joint. However, the formation of the threads, in particular the internal thread in the sheet metal of the spring plate, gives rise to high production costs and effort. Furthermore the sheet of the spring plate may be too thin for the formation of a load-bearing thread, so that there is a risk that under axial tensile forces the tear-out strength of the joint will be too low.

SUMMARY OF THE INVENTION

Starting from there the purpose of the present invention is to be able to produce a connecting system of the type mentioned at the start, which can be produced with low production cost and effort. In addition, a high tear-out strength must be achieved.

That objective is achieved by a connecting system as indicated in the description given below.

The connecting system for a vehicle wheel suspension comprises a spring plate for receiving a vehicle spring, a joint and a connecting strut which is connected to the spring plate in an articulated manner, which joint comprises a fastening section that extends in an axial direction and engages in a fastening hole provided in the spring plate, passing through the fastening hole and being shaped outside it, on a side of the spring plate facing away from the joint, to form a contact surface that rests axially against the spring plate.

There is no need to form threads in the fastening hole and on the fastening section, so that despite the shaping operation to form the contact area production costs can be kept low. Furthermore the contact surface is formed outside the fastening hole, thereby avoiding any dependence of the tear-out strength of the ball joint on the load-bearing capacity of an internal thread formed in the fastening hole. In particular, the area over which the contact surface is supported axially against the spring plate can be made relatively large. It is also possible to reinforce the spring plate in the area over which the contact surface rests against it, for example by shaping it suitably as with a rib or the like. In this way a high tear-out strength of the joint under axial tension loads can be achieved. Moreover, there is no need for a weld joint to connect the connecting strut to the spring plate. Accordingly any warping of components, or the negative effect on the materials due to strong local heat input, can be avoided. In addition, the investment cost of a welding unit can be saved.

The joint is preferably fastened to the spring plate by means of the fastening section. In particular, the fastening hole is a through-going hole. Preferably, the fastening hole extends in the axial direction through the spring plate. Preferably, the fastening hole is a round hole. In particular, the fastening section and/or the fastening hole are associated with a central axis running in the axial direction, which preferably passes through the fastening section and/or through the fastening hole. Advantageously, the central axis extends through the middle of the fastening section and/or the fastening hole. For example, the fastening section can be shaped rotationally symmetrically relative to the central axis. In particular, an edge of the spring plate that delimits the fastening hole surrounds the central axis.

Preferably, the contact surface comprises or forms a contact area on which the contact surface is supported or rests axially against the spring plate. Preferably, the contact area is outside the fastening hole. In particular, the contact area faces toward the joint. Advantageously, the contact area surrounds the central axis. Preferably, the contact area extends perpendicularly or substantially perpendicularly to the axial direction.

The contact surface is preferably located outside the fastening hole. In particular, the contact surface is arranged on the side of the spring plate facing away from the joint. Preferably, on the side of the spring plate facing away from the joint, the contact surface is supported axially against the spring plate. Advantageously, the contact surface is supported axially on an edge area of the spring plate that surrounds the fastening hole and/or extends around the central axis on the contact area side. In particular, this edge area is located on the side of the spring plate facing away from the joint and/or faces away from the joint. Preferably, the contact surface rests axially against the spring plate, in particular against the edge area on the contact surface side.

Preferably, the edge area and/or the spring plate comprises or forms a supporting surface on the contact surface side, against which the contact surface is supported or rests axially. In particular, the supporting surface on the contact surface side is located on the side of the spring plate that faces away from the joint. Advantageously, the supporting surface on the contact surface side is flat, or substantially so. In particular, the supporting surface on the contact surface side is annular. Preferably, the supporting surface on the contact surface side extends around the central axis. Preferably, the supporting surface on the contact surface side is perpendicular to the axial direction, or substantially perpendicular thereto. Advantageously, the supporting surface on the contact surface side is formed by an area of the surface of the spring plate.

In a further development, the joint comprises an abutment, which is supported on the spring plate axially, in particular axially opposite the contact surface, on the side of the spring plate facing toward the joint. In particular, the abutment is positioned on the side of the spring plate facing toward the joint. Thus, the spring plate is positioned axially between the contact surface and the abutment and/or the contact surface and the abutment are located in the axial direction on different sides of the spring plate. Preferably, the contact surface and the abutment are supported against the spring plate opposite one another in the axial direction. In particular, relative to the fastening section and/or the contact surface the abutment is in a fixed position. Advantageously, the abutment is supported on an edge area of the spring plate on the joint side, that surrounds the fastening hole and/or extends around the central axis, in particular axially opposite the contact surface. In particular this edge area is on the side of the spring plate facing toward the joint and/or in particular faces toward the joint. Preferably the abutment rests axially, in particular axially opposite the contact surface, against the spring plate, in particular against the edge area on the joint side. By means of the contact surface and the abutment, the joint is held fast on the spring plate in an interlocked manner. The abutment can be located inside and/or outside the fastening hole. For example, the abutment is annular. Preferably, the abutment extends around the central axis. The fastening section projects, for example axially, from the abutment which in that case, in particular, surrounds the fastening section.

Preferably, the edge area and/or the spring plate comprise or form a supporting surface on the joint side, against which the abutment rests or is in contact in particular axially opposite the contact surface. Preferably, the supporting surface on the joint side is on the side of the spring plate facing toward the joint. The supporting surface on the joint side can be inside and/or outside the fastening hole. In particular, the supporting surface on the joint side faces toward the joint. Advantageously, the supporting surface on the joint side is formed by an area of the surface of the spring plate. For example, the supporting surface on the joint side is annular. Preferably, the supporting surface on the joint side extends around the central axis.

In a first variant, the abutment is flat. Preferably, the abutment extends perpendicularly to the axial direction. The supporting surface on the joint side is preferably flat. Advantageously, the supporting surface on the joint side extends perpendicularly to the axial direction.

In a second variant, the abutment is of conical shape, in particular tapering progressively with increasing distance from the contact surface. Preferably, the abutment is rotationally symmetrical relative to an axially extending rotational axis which preferably coincides with the central axis. Preferably, the fastening hole and/or the edge area on the joint side and/or the supporting surface on the joint side is/are at least partially of conical shape, tapering in the conical area in particular with decreasing distance from the contact surface. Advantageously, the conical portion is rotationally symmetrical relative to an, or to the axially extending rotational axis.

In one design, the joint is in the form of a ball joint. For this, the joint has in particular a housing and a ball pin with a joint ball, which with its joint ball is fitted and able to move in the housing, out of which it extends. Advantageously, the ball pin extends out of the housing axially or substantially so. The joint is preferably in the form of an axial joint, in particular an axial ball joint. Advantageously, the contact area and/or the edge area on the joint side and/or the supporting surface on the joint side face toward the housing. Preferably, the edge area on the contact surface side and/or the supporting surface on the contact surface side face away from the housing. Preferably, the fastening section extends away from the housing.

In a first alternative, the fastening section is formed by the ball pin, and in particular the connecting strut is connected firmly, preferably rigidly to the housing or contains it. The abutment is preferably provided on the ball pin.

In a second alternative, the fastening section is provided on the housing, and in particular the connecting strut is connected firmly, preferably rigidly to the ball pin and/or contains or forms it. Preferably the fastening section is connected firmly, in particular rigidly to the housing and/or is formed integrally with it. Advantageously, the fastening section forms an extension or projection of the housing. For example, the fastening section is in the form of a pin. The abutment is preferably provided on the housing. Advantageously, the abutment is formed by part of the outer surface of the housing, in particular by part of the outer surface of the housing that faces toward the spring plate. However, the abutment can also be provided on the fastening section.

Preferably, the housing is provided with an pin aperture through which the ball pin extends out of the housing. In particular, the pin aperture is preferably provided in the axial direction, on a side of the housing opposite the fastening section. Advantageously, the pin aperture is provided in particular in the axial direction, on a side of the housing opposite the abutment and/or the part of the outer surface that forms the abutment.

In a further development, means are provided for preventing rotation, by which means the fastening section and/or the housing is/are secured against rotation relative to the spring plate, in particular rotation about the axially extending central axis of the fastening hole. Advantageously, for this the fastening section and/or the abutment and/or the housing is/are provided with at least one interlocking contour which mutually engages with the spring plate to form the rotation preventing means. For example, the interlocking contour consists of knurling, a projection (for example in the form of a stud) or a recess (for example in the form of a groove). The interlocking contour preferably mutually engages with a counterpart interlocking contour provided in the spring plate. For example, the counterpart interlocking contour is a recess or groove in which the projection of the interlocking contour engages, or the counterpart interlocking contour has for example a projection which engages in the recess of the interlocking contour. Furthermore, the fastening section and/or the abutment and/or the housing can be connected to the spring plate by means of a groove and spring connection or a shaft and hub connection, in order to form the rotation preventing means. In the case of knurling, the knurling in particular presses into the surface of the spring plate. Needless to say, it is also possible as the rotation preventing means to provide knurling on the spring plate, which in particular presses into the surface of the housing and/or the abutment.

In one design version, to form the contact surface the fastening section is shaped by rolling, corrugation, pressing or some other known process. Preferably, in particular before the contact surface has been formed, the fastening section has at one free end face a recess and a rim that surrounds it. In particular, this rim is what is shaped when forming the contact surface. As a rule such a rim can be deformed with less effort than when the fastening section consists of solid material in its deformation area, although that too is possible. In particular, the free end face of the fastening section faces away from the joint and/or the housing.

In a further development, the connecting strut is formed by a stabilizer or by a stabilizer link connected to a stabilizer or by some part of these. Preferably, the stabilizer is in the form of a torsion-bar spring. In particular, the stabilizer in articulated to the spring plate by means of the stabilizer link. Preferably, the spring plate is provided on and/or fixed to an outer tube of the damper.

According to a further development, a wheel carrier is articulated to a vehicle body of a vehicle by means of at least one wheel suspension link and supported on the vehicle body in a sprung manner by a, or by the vehicle spring, which on the wheel carrier side is supported by the spring plate connected to the wheel carrier or the wheel suspension link. Advantageously, the spring plate is connected to the wheel carrier or the wheel suspension link by way of the damper. In particular, the wheel carrier or the wheel suspension link are also connected to the vehicle body by way of the damper. For example, the outer tube of the damper is connected to the wheel carrier or the wheel suspension link, so that an internal damper component guided and able to move within the damper tube is connected to the vehicle body. Preferably, the damper extends at least partially inside the vehicle spring, which is advantageously in the form of a helical spring. The stabilizer is preferably mounted on the vehicle body. A vehicle wheel mounted to rotate about a wheel rotational axis is preferably fitted on the wheel carrier.

The stabilizer link preferably comprises an elongated body connected at one end to the joint. Advantageously, the housing forms a first part of the joint and the ball pin forms a second part thereof, such that one part of the joint is connected firmly, in particular rigidly to the spring plate and the other part of the joint is connected firmly, in particular rigidly to the elongated body or made integrally with it.

In accordance with an alternative, or with a first alternative, the elongated body is connected to the housing or contains or forms it, and the ball pin is connected to the spring plate. In another, or second alternative, the elongated body is connected to the ball pin or contains or forms it, and the housing is connected to the spring plate.

In a further development the stabilizer link has two hinges, one of which constitutes the joint described earlier. The other hinge is preferably arranged at another end of the elongated body. By means of the other hinge the stabilizer link is preferably articulated to the stabilizer. In particular, the elongated body connects the two hinges with one another.

The ball pin is preferably made of metal, in particular steel. Moreover, the housing is preferably made of metal, in particular steel. The ball pin is fitted into the housing so that it can move, preferably by rotation and/or swiveling, preferably with interposition of a ball cup, in particular one arranged in the housing. Preferably, the ball cup encloses the joint ball. In particular, the ball cup is made of plastic. The spring plate preferably consists of metal, especially steel. The spring plate is preferably a sheet component.

BRIEF DESCRIPTION OF THE DRAWINGS

Below, the invention will be described with reference to a preferred embodiment, referring to the drawing, which shows.

DETAILED DESCRIPTION OF THE PREFERRED EMBODIMENTS

Figure 1:
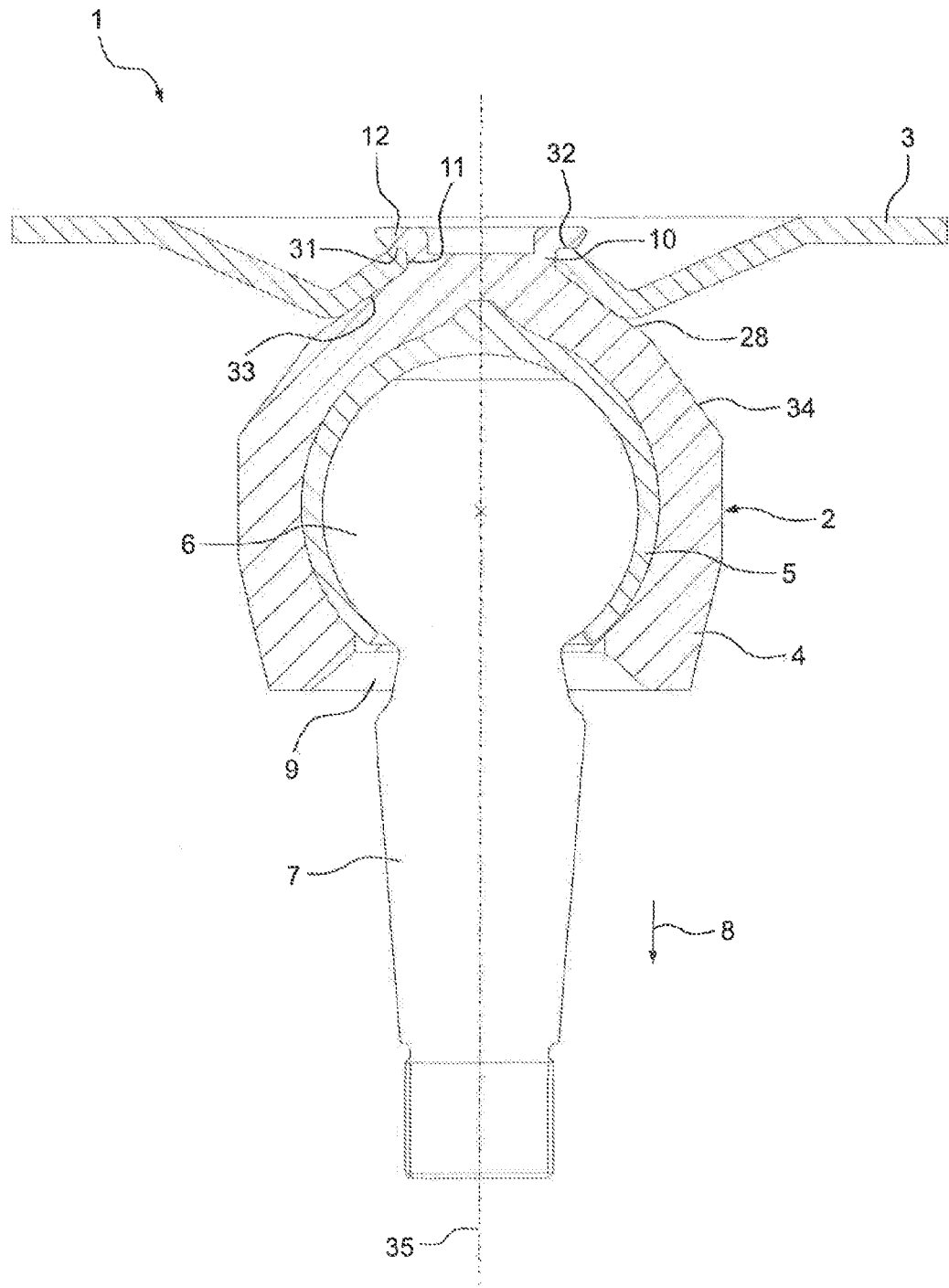
FIG. 1: A sectioned view through an embodiment of a connecting system.
Figure 2:
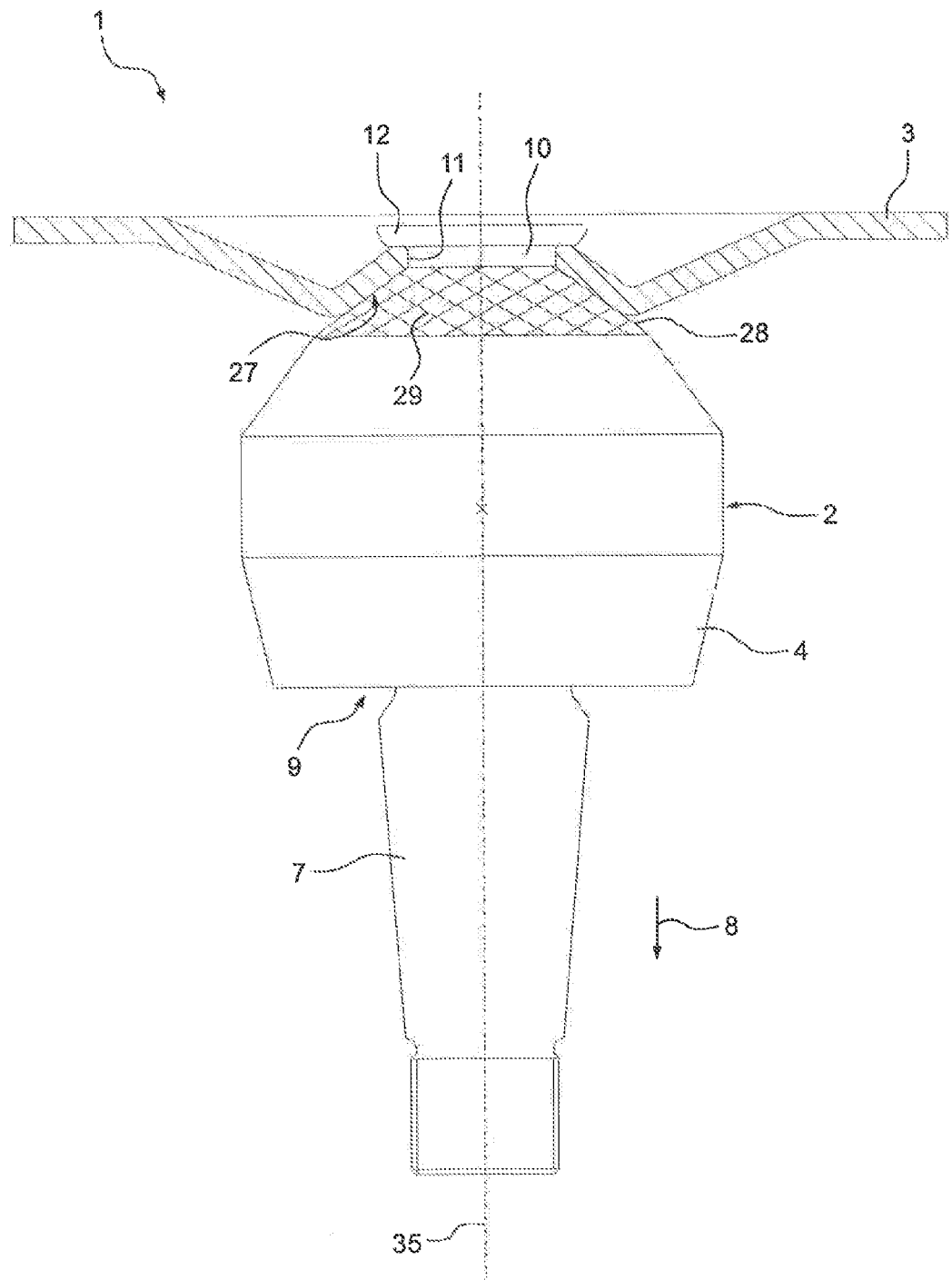
FIG. 2: A partial sectioned view of the connecting system.

FIGS. 1 and 2 show different views of a connecting system 1 according to an embodiment, wherein an axial ball joint 2 is fixed with interlock onto a spring plate 3. The ball joint 2 comprises a housing 4 in which is arranged a ball cup 5 inside which a ball pin 7 with a joint ball 6 is fitted so that the joint ball 6 can slide. Through a pin aperture 9 provided in the housing 4, the ball pin 7 extends in an axial direction 8 out of the housing 4. On the side of the housing 4 opposite the pin aperture 9 is provided a fastening section 10 in the form of an axial extension of the housing 4, which extends axially through a fastening hole 11 provided in the spring plate 3 and which, on the side of the spring plate 3 facing away from the ball joint 2, is shaped in such manner that the shaped area of the fastening section 10 forms a contact surface 12 which, on the side of the spring plate 3 facing away from the ball joint 2, rests with an annular contact face 31 axially against a supporting surface 32 of the spring plate 3 that extends around a central axis 35 of the fastening hole 11. The contact face 31 of the contact surface 12 faces toward the housing 4 while the supporting surface 32 faces away from the housing 4. The fastening section 10 can be shaped, for example, by rolling, corrugation or pressing.

Furthermore, on its side facing toward the housing 4, the spring plate 3 has a conical recess 27, which merges into the fastening hole 11 and is formed by a supporting surface 33 of the spring plate 3 that extends around the central axis 35 and that faces toward the housing 4. A conical abutment 28 provided on the housing 4 engages in the recess 27 and is in contact with the supporting surface 33. Thus, the housing 4 is held fast with axial interlock on the spring plate 3. The abutment 28 is formed by an area of the outer surface 34 of the housing 4 that faces toward the spring plate 3 and is in addition provided with knurling 29, which presses into the surface of the spring plate 3, thus serving as rotation-preventing means so that any rotation of the housing 4 relative to the spring plate 3 can be prevented.

Figure 3:
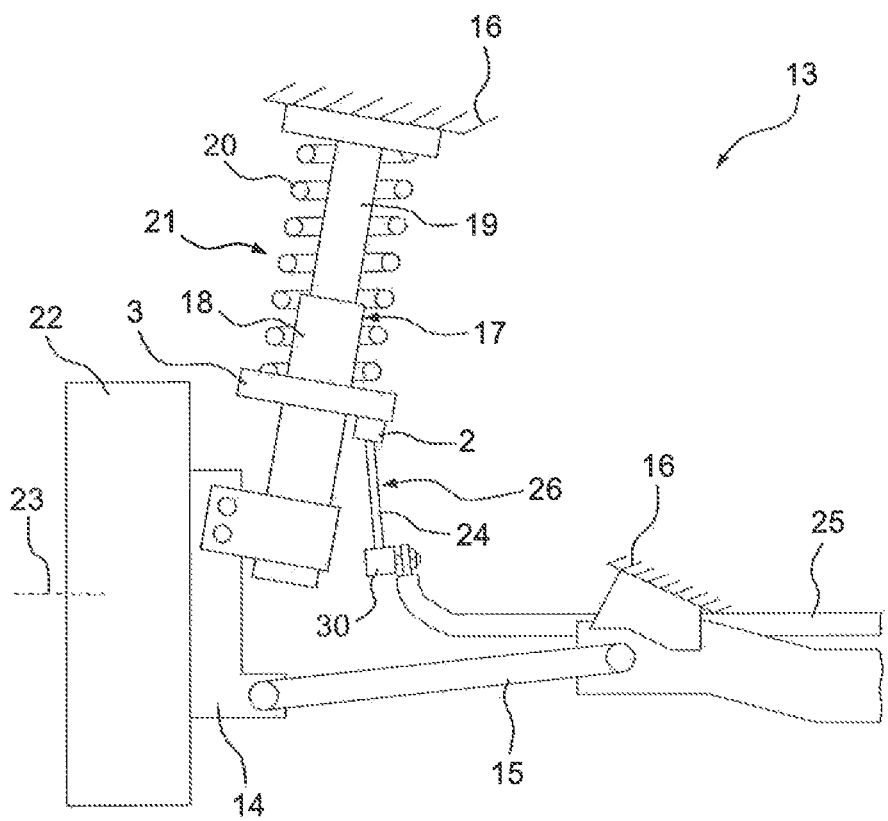
FIG. 3: A schematic representation of a vehicle wheel suspension comprising the connecting system.

FIG. 3 shows a schematic view of a vehicle suspension 13, wherein a wheel carrier 14 is articulated by means of a transverse control arm 15 to the body 16 of a vehicle. The wheel carrier 14 is also connected to the vehicle body 16 by a damper 17. The damper 17 comprises an outer tube 18 attached to the wheel carrier 14, inside which the inner portion 19 of the damper 17, which is connected to the vehicle body 16, is guided. To the outer tube 18 is attached the spring plate 3 against which a vehicle spring 20 is supported, by means of which spring the wheel carrier 14 is supported on the vehicle body 16 in a sprung manner. The damper 17 extends through the spring 20, so that the damper 17 together with the spring plate 3 and the vehicle spring 20 form a spring damper unit 21, also known as a suspension strut. On the wheel carrier 14 is fitted a vehicle wheel 22 which can rotate about a wheel rotational axis 23.

The ball pin 7 is connected to or formed integrally with a connecting strut 24 in the form of an elongated body, which at its end remote from the ball joint 2 is articulated by another joint 30 to a stabilizer 25 mounted on the vehicle body 16, which is in the form of a torsion-bar spring. The connecting strut 24 is part of a stabilizer link 26 which also comprises the joints 2 and 30. The joint 30 is preferably a ball joint.

INDEXES

1 Connecting system
2 Axial ball joint
3 Spring plate
4 Housing
5 Ball cup
6 Joint ball of the ball pin
7 Ball pin
8 Axial direction
9 Pin aperture in the housing
10 Fastening section/axial extension
11 Fastening hole in the spring plate
12 Contact surface
13 Wheel suspension
14 Wheel carrier
15 Transverse control arm
16 Vehicle body
17 Damper
18 Outer tube of the damper
19 Inner portion of the damper
20 Vehicle spring
21 Spring-damper unit
22 Vehicle wheel
23 Wheel rotational axis
24 Connecting strut
25 Stabilizer
26 Stabilizer link
27 Conical recess in the spring plate
28 Abutment
29 Knurling
30 Joint
31 Contact area
32 Supporting surface on the contact area side
33 Supporting surface on the joint or housing side
34 Outer surface of the housing
35 Central axis

The invention claimed is:

1. A connecting system for a vehicle wheel suspension, with a spring plate (3) against which a vehicle spring (20) is supported, a joint (2) and a connecting strut (24), which is articulated to the spring plate (3) by the joint (2),
the joint comprises a fastening section (10) extending in an axial direction (8) and engaging in a fastening hole (11) formed in the spring plate (3),
the fastening section (10) passing through the fastening hole (11) and being shaped outside the fastening hole, on a side of the spring plate (3) facing away from the joint (2), to form a contact surface (12) that is supported axially against the spring plate (3).

2. The connecting system according to claim 1, wherein the joint (2) comprises an abutment (28) which is supported, on a side of the spring plate (3) facing toward the joint (2), against the spring plate (3) axially opposite the contact surface (12).

3. The connecting system according to claim 1, wherein the joint (2) comprises a housing (4) and a ball pin (7) with a joint ball (6), the joint ball (6) is fitted within and movable with respect to the housing (4), and the ball pin (7) extends either axially or substantially axially out of the housing, the fastening section (10) is provided on the housing (4) and the connecting strut (24) either is connected firmly to the ball pin (7) or comprises part of the ball pin (7).

4. The connecting system and according to claim 3, wherein an abutment (28) is formed by an area of an outer surface (34) of the housing (4) that faces toward the spring plate (3).

5. The connecting system according to claim 4, wherein the housing (4) is provided with a pin aperture (9) through which the ball pin (7) extends out of the housing (4), and the pin aperture (9) is extends in the axial direction (8), on a side of the housing (4) opposite the fastening section (10), away from the housing.

6. The connecting system according to claim 4, wherein the fastening section (10) is one of firmly connected to the housing (4) or is formed integrally with the housing.

7. The connecting system according to claim 4, wherein the connecting system comprises rotation preventing means by virtue of which the housing (4) is secured against rotating relative to the spring plate (3).

8. The connecting system according to claim 1, wherein the fastening section (10) is shaped by one of rolling, corrugation or pressing to form the contact surface (12).

9. The connecting system according to claim 1, wherein a wheel carrier (14) is articulated to a vehicle body (16) of a vehicle by at least one transverse control arm (15) and is supported, in a sprung manner, on the vehicle body (16) by a vehicle spring (20), which on a wheel carrier side is supported on the spring plate (3) connected to either the wheel carrier (14) or the transverse control arm (15).

10. A connecting system for a vehicle wheel suspension, with a spring plate (3) for receiving a vehicle spring (20), a joint (2) and a connecting strut (24), which is articulated to the spring plate (3) by the joint (2),
the joint comprises a fastening section (10) extending in an axial direction (8) and engaging in a fastening hole (11) formed in the spring plate (3),
the fastening section (10) passing through the fastening hole (11) and being shaped outside the fastening hole, on a side of the spring plate (3) facing away from the joint (2), to form a contact surface (12) that is supported axially against the spring plate (3), and
the connecting strut (24) is formed by either a stabilizer or a stabilizer link (26) connected to a stabilizer (25) or by a part of the stabilizer (25).

11. The connecting system according to claim 10, wherein the stabilizer (25) is in a torsion-bar spring which is articulated to the spring plate (3) by the stabilizer link (26).

12. The connecting system according to claim 10 wherein the stabilizer (25) is mounted on the vehicle body (16).

13. A connecting system for a vehicle wheel suspension comprising:
a spring plate receiving a vehicle spring, a joint and a connecting strut, the vehicle spring being supported against the spring plate,
the connecting strut being articulated to the spring plate via the joint,
the joint comprising a housing which pivotally retains a joint ball and ball pin, a fastening section of the housing extending in an axial direction and engaging in a fastening hole formed in the spring plate,
the fastening section of the housing extending through the spring plate to an axial side of the spring plate opposite from the joint ball and the ball pin,
the fastening section being shaped to form a contact surface that mates with axially opposite sides of the spring plate so as to prevent movement of the joint in the axial direction with respect to the spring plate.

14. The connecting system according to claim 13, wherein the housing has an abutment which mates with the spring plate, such that the spring plate is positioned axially between the contact surface and the abutment.

15. The connecting system according to claim 13, wherein the housing has an abutment which mates with the spring plate, such that the contact surface and the abutment are located in the axial direction on opposite sides of the spring plate.

\* \* \* \* \*